Aug. 23, 1927.
C. B. GRAY
1,639,994
MACHINE FOR CUTTING SHEET FORM MATERIAL
Filed March 15, 1923     5 Sheets-Sheet 3
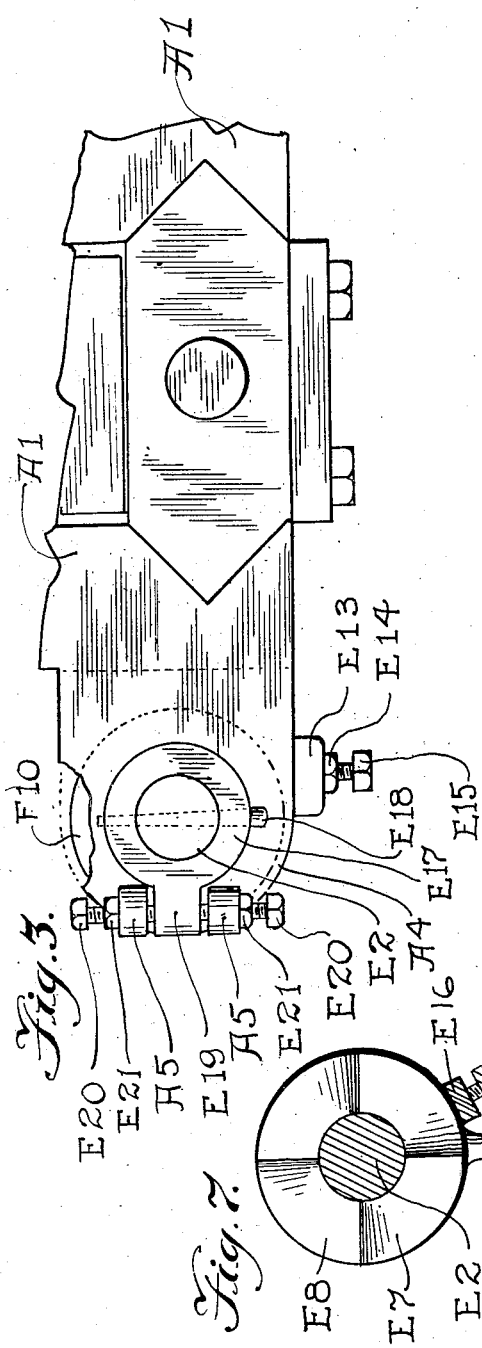
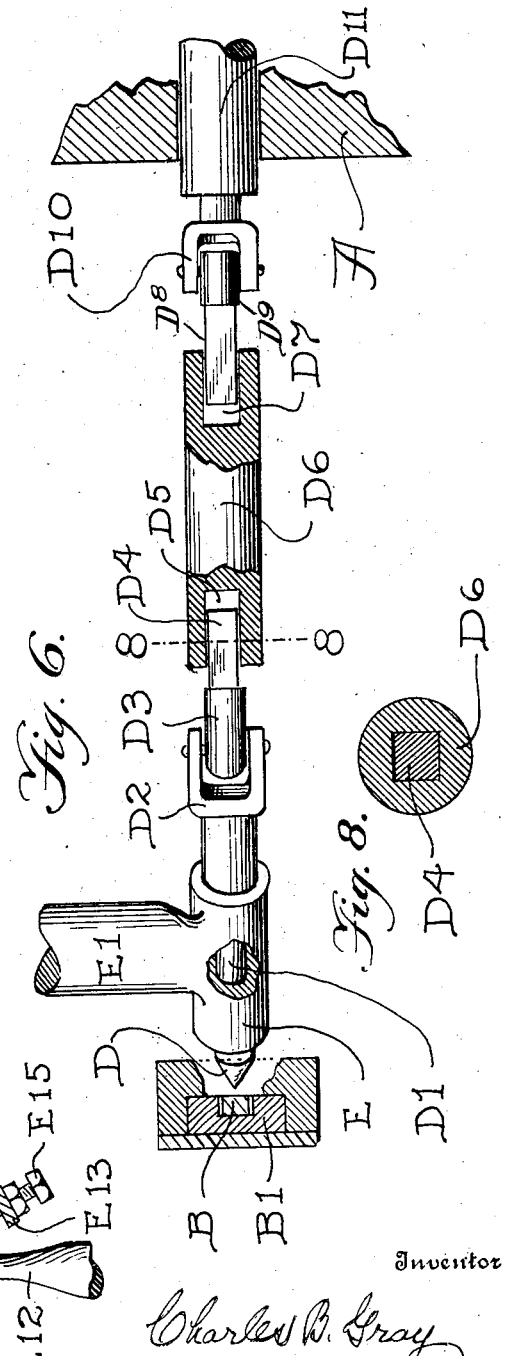
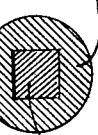

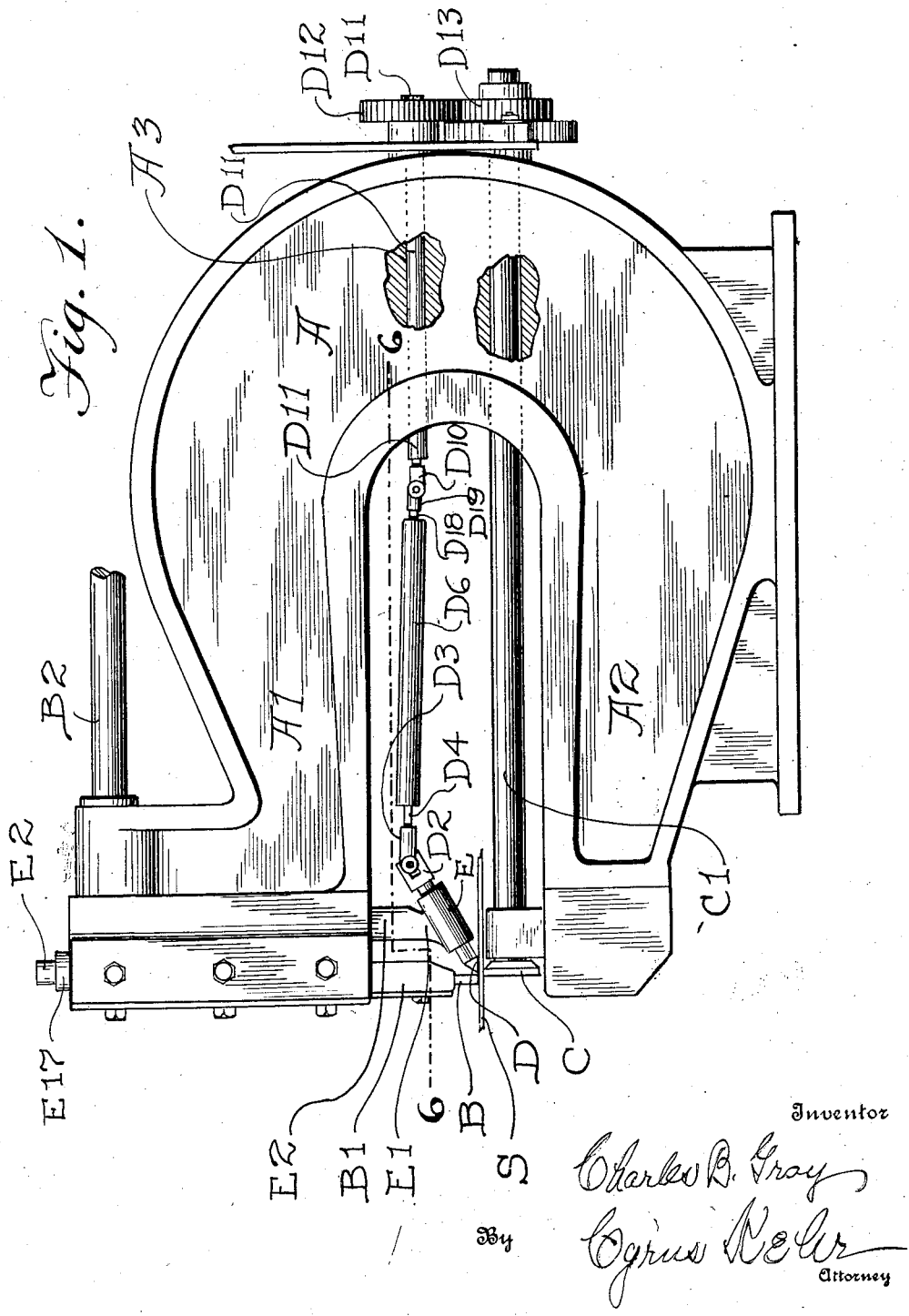

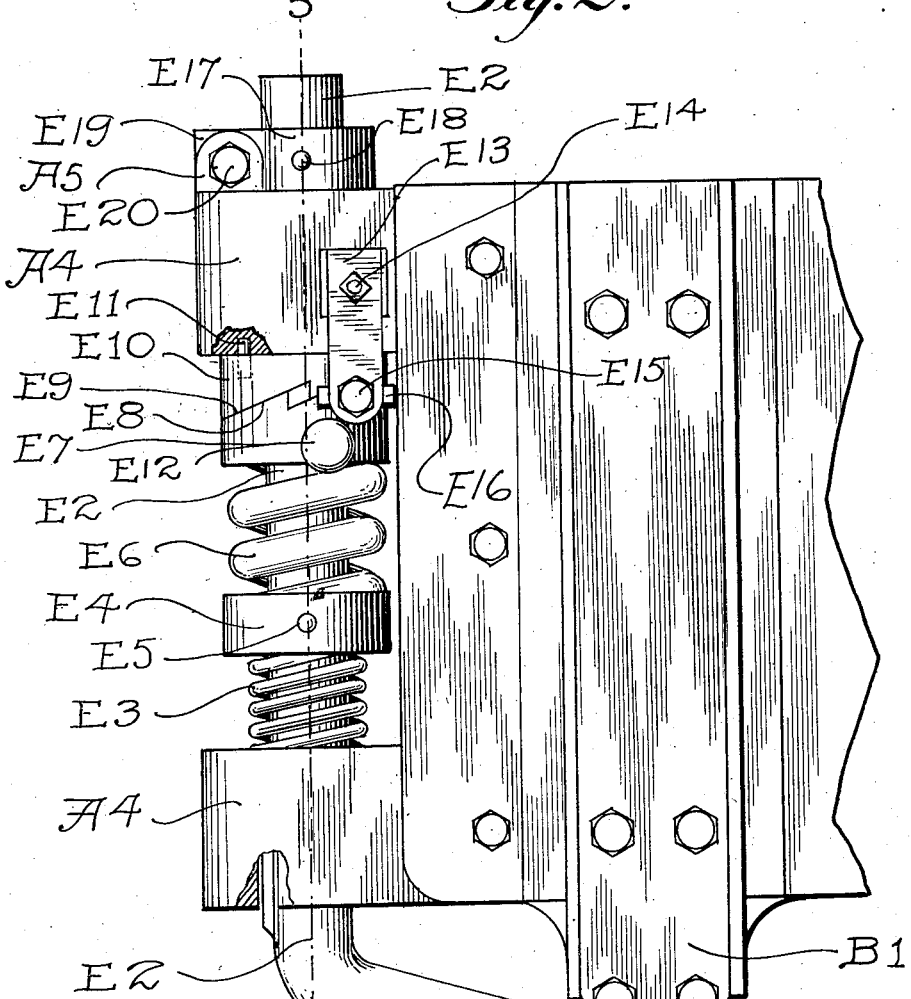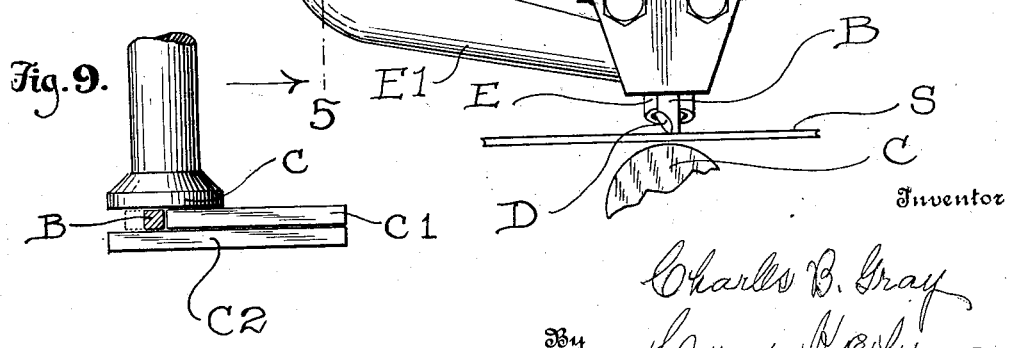

Aug. 23, 1927. 1,639,994
C. B. GRAY
MACHINE FOR CUTTING SHEET FORM MATERIAL
Filed March 15, 1923 5 Sheets-Sheet 4
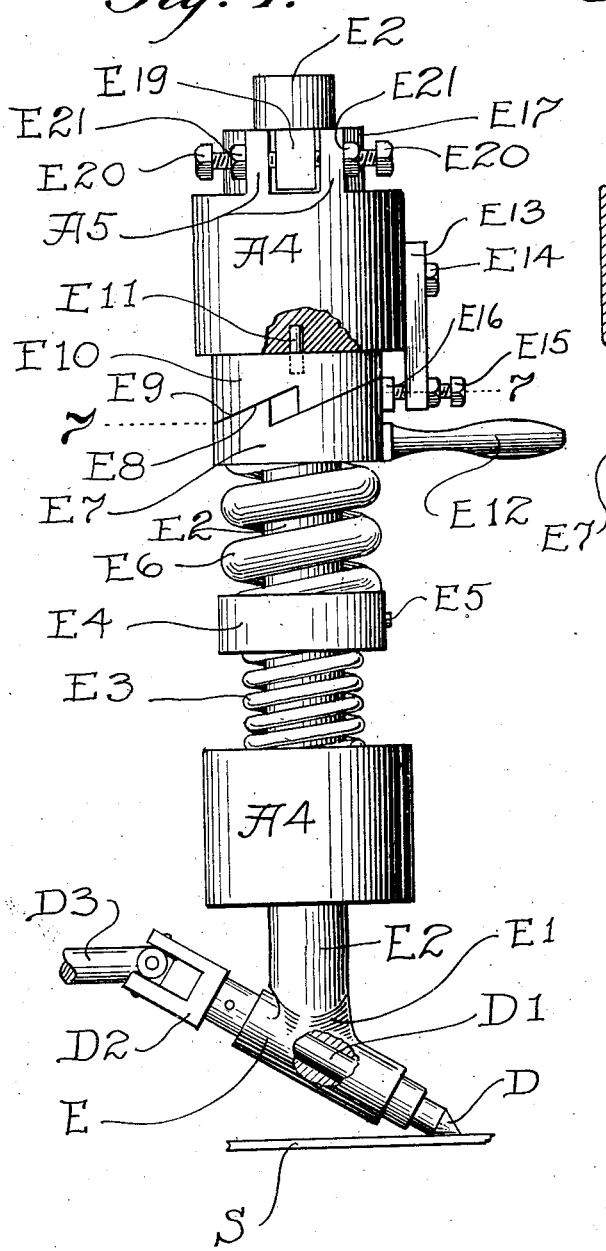
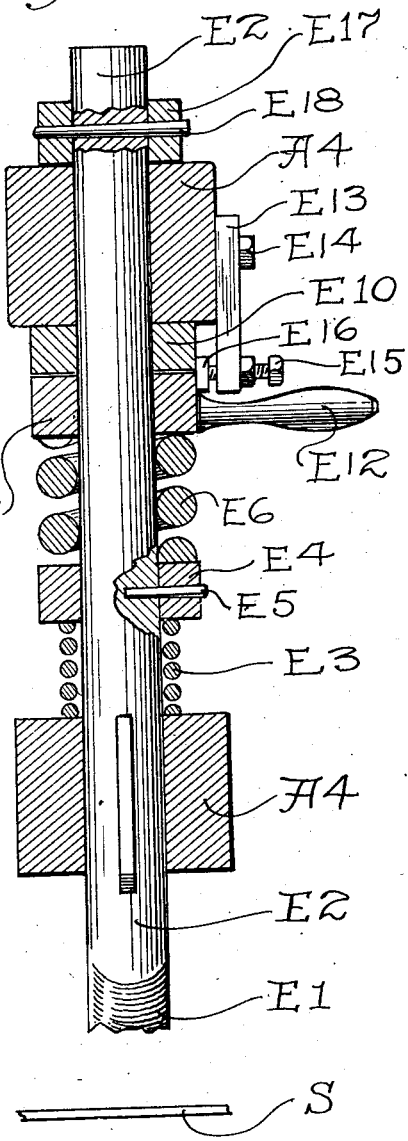
Inventor
Charles B. Gray
By Cyrus Kehr
Attorney Aug. 23, 1927. 1,639,994
C. B. GRAY
MACHINE FOR CUTTING SHEET FORM MATERIAL
Filed March 15, 1923 5 Sheets-Sheet 5
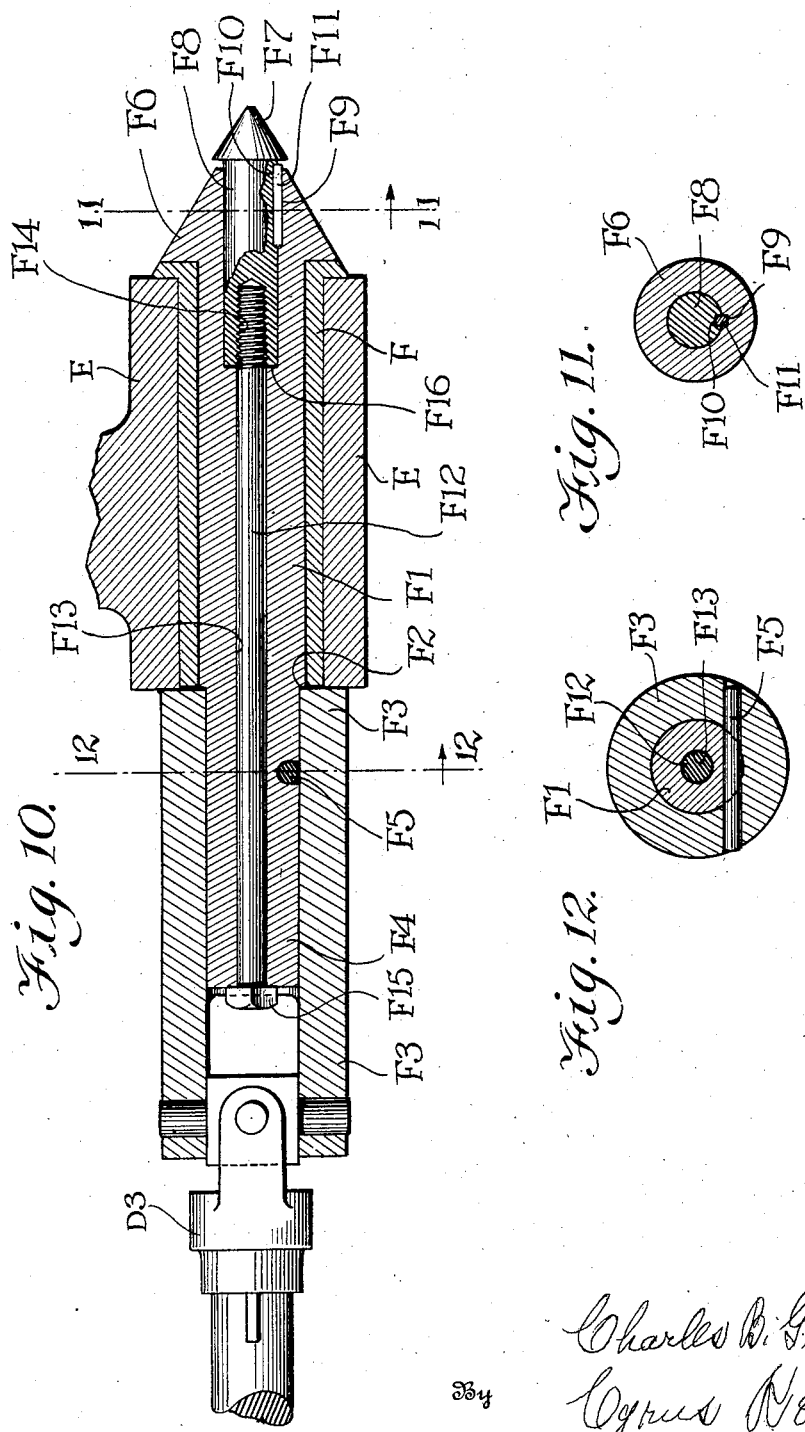

Patented Aug. 23, 1927.

1,639,994

UNITED STATES PATENT OFFICE.

CHARLES B. GRAY, OF PHILADELPHIA, PENNSYLVANIA.

MACHINE FOR CUTTING SHEET-FORM MATERIAL.

Application filed March 15, 1923. Serial No. 625,327.

This improvement relates particularly to machines for cutting sheet-form material in which machines the chief cutting element is a reciprocatory cutter located above and perpendicular to the sheet plane and reciprocated by power mechanism. For machines of this type reference is made to my former United States Patents, No. 1,098,376 and No. 1,098,377, both granted June 2, 1914.

The object of this invention is to provide improved means for feeding the sheet which is to be cut. The improvement relates directly to the upper feed member—the feed member which is located above the sheet plane.

In the accompanying drawings,

Fig. 1 is an elevation of the front of a machine embodying my improvement;

Fig. 2 is a view of the same machine looking toward the right as shown in Fig. 1, parts being broken away;

Fig. 3 is a plan of the left hand portion of the machine;

Fig. 4 is a rear elevation of the left hand portion of the machine;

Fig. 5 is an upright section on the line, 5—5, of Fig. 2, looking in the direction of the arrow;

Fig. 6 is a horizontal section on the line, 6—6, of Fig. 1;

Fig. 7 is a horizontal section on the line, 7—7, of Fig. 4;

Fig. 8 is an upright section on the line, 8—8, of Fig. 6;

Fig. 9 is a horizontal section along the sheet plane and showing the cutting mechanism and the lower feed member;

Figs. 10, 11 and 12 illustrate another form of the upper feed roller and the means supporting said roller.

Referring to said drawings, A, is the body of the machine. This has an upper arm, $A^1$, and a lower arm, $A^2$. Between said arms is the throat of the machine. In said throat is the horizontal sheet plane in which lies the sheet, S, which is to be cut. Below the sheet plane is the lower feed roller, C, which is similar to the lower feed roller described in my above-mentioned patents. Said roller may also serve as one of the lower cutting members as described in said patents. Beside the roller, C, are the stationary lower cutters, $C^1$ and $C^2$ (Fig. 9). Above the sheet plane, the upper reciprocatory cutter, B, is supported by a holder, $B^1$, which is reciprocated in an upright path by a pitman (not shown) which is actuated by the upper drive shaft, $B^2$, as described in said patents. In the machines of said patents there is an upper feed roller mounted on a horizontal axle similar to the lower feed roller, C.

In the present improvement I substitute a conical rotary feed member for the former roller or wheel, and this conical feed member is mounted on an oblique axis whereby the lower part of the conical face is brought parallel to the sheet plane and adapted to bear upon the upper face of the sheet, S.

The feed member, D, is fixed on the lower end of the inclined shaft, $D^1$, which rests in the bearing, E, which is rigid on the lateral, oblique arm, $E^1$, of the upright reciprocatory shaft or bar, $E^2$. The shaft, $D^1$, extends upward and to the right of the bearing, E, and is fixed in a joint member, $D^2$, which is coupled to another joint member, $D^3$, to form a universal joint. The member, $D^3$, has a four-sided stem, $D^4$, which extends slidably into a socket, $D^5$, formed in the adjacent end of the horizontal shaft member, $D^6$, which extends rightward of said joint. The opposite end of said member, $D^6$, has a similar socket, $D^7$, which receives the four-sided stem, $D^8$, of a joint member, $D^9$, which couples with the joint member, $D^{10}$, which is secured to the shaft, $D^{11}$. The members, $D^9$ and $D^{10}$, form a universal joint. The shaft, $D^{11}$, rests in the stationary horizontal bearing, $A^3$, in the body of the machine. Said shaft projects out through the right hand end of said body and there supports a spur gear wheel, $D^{12}$, which meshes with the spur gear wheel, $D^{13}$, which surrounds the lower drive shaft, $C^1$, which receives motion in the manner described in the above-mentioned patents. The lower feed roller, C, receives motion from said lower drive shaft. Thus whenever the lower drive shaft is rotated, the lower feed roller or wheel and also the upper conical feed member are rotated in opposing directions, so that the faces of these feed members which bear against the sheet, S, will move in the same direction.

The bar, $E^2$, rests slidably in the upright bearings, $A^4$, which form a part of the upper arm, $A^1$, of the body of the machine. Said bar is cylindrical and is feathered loosely in the bearings, $A^4$, to permit only limited turning and to permit endwise movement. Above the lower bearing, $A^4$, an expanding coiled spring, $E^3$, surrounds the bar, $E^2$, and bears downward against said bearing and upward against a collar, $E^4$, surrounding the bar and fixed thereto by a pin, $E^5$. Thus said spring constantly tends to lift said bar. Above said collar the bar is surrounded by a heavier spring, $E^6$, which rests on said collar and bears upward against a collar, $E^7$, which is loose on said bar and has an upper cam face, $E^8$, which bears against a corresponding cam face, $E^9$, on the collar, $E^{10}$, which surrounds the bar, $E^2$, and is engaged to the upper bearing, $A^4$, by a dowel, $E^{11}$, to prevent the turning of said collar. On the collar, $E^7$, is a handle, $E^{12}$, by which said collar may be turned far enough to change the relation of the cam faces and thereby force the collar, $E^7$, downward against the resistance of the weaker spring, $E^3$. When the arm, $E^{12}$, has been turned back to allow the collar, $E^7$, to rise, the weaker spring, $E^3$, presses the collar, $E^4$, upward, whereby the bar and the spring, $E^6$, and the collar, $E^7$, are lifted to their upper limit. Through these adjustments, the conical feed member, D, is raised and lowered. When said feed member has been set in its lower position for work, the heavier spring yields slightly to allow the feed member to pass over irregularities in the sheet, S. A bracket, $E^{13}$, secured to the upper bearing, $A^4$, by means of a cap screw, $E^{14}$, extends downward over the side of the collar, $E^7$. A screw, $E^{15}$, extends horizontally through the lower part of said bracket and bears against a brake block, $E^{16}$, which bears against the upright face of the collar, $E^7$. Said brake mechanism tends to hold said collar in the position into which it is turned by moving the handle, $E^{12}$.

Two ears, $A^5$, are placed on the rim of the upper bearing, $A^4$. A collar, $E^{17}$, surrounds the upper end of the bar, $E^2$, and is secured thereto by a cross pin, $E^{18}$, and has a lateral arm, $E^{19}$, which extends between the ears, $A^5$. A set bolt, $E^{20}$, is threaded horizontally through each ear, $A^5$, in position to bear against the arm, $E^{19}$. A jam nut, $E^{21}$, surrounds each of said bolts, and is adapted to bear against the adjacent ear to bind the adjacent bolt against rotation. By retracting one of these bolts and driving the other forward, the bar, $E^2$, may be turned to move the conical feed member horizontally and to precise position. During the endwise movements of the bar or shaft, $E^2$, the arm, $E^{19}$, slides up and down between the set bolts, $E^2$.

And during the endwise movements of the shaft, $E^2$, whereby the member, D, is raised and lowered, the joints between the shafts, $D^{11}$ and $D^1$, allow adjustment.

The conical feed member, D, occupies small space and obstructs the view at the cutting line only a little. Furthermore, placing said member in the oblique position permits raising the shaft, $D^6$, to make more clear throat space.

Referring now to Figs. 10, 11 and 12, a bushing, F, is placed into the bearing, E, of Fig. 4. Within the bushing is placed the body, $F^1$, having shoulder, $F^2$, bearing against the coupling member, $F^3$. The body, $F^1$, has a neck, $F^4$, reaching into the coupling, $F^3$, and secured to the coupling by a pin, $F^5$. On the forward part of the body is the head, $F^6$, which is in the form of a truncated cone. A conical tip, $F^7$, has a stem, $F^8$, extending into the head, $F^6$, and the body, $F^1$. On the body, $F^8$, and in the head are key ways, $F^9$ and $F^{10}$, which receive a key, $F^{11}$, whereby relative rotation of the stem, $F^8$, and the tip, $F^7$, is prevented. A long bolt, $F^{12}$, extends through the bore, $F^{13}$, of the body, $F^1$, and is threaded into a socket, $F^{14}$, in the inner end of the stem, $F^8$, of the conical tip, $F^7$. The head, $F^{15}$, of the bolt bears against the end of the neck, $F^4$. By turning the bolt forward, the stem, $F^8$, and the tip, $F^7$, are drawn rearward in the head, $F^6$, against the shoulder, $F^{16}$, on the body, $F^1$. The tip, $F^7$, is preferably made a little larger than the head, $F^6$, in order that the head, $F^6$, will not make engagement with the sheet which is to be cut.

In both forms herein described, the conical feed roller leaves the marked cutting line exposed to the view of the operator. In my former machines of this kind, the upper wheel-form roller was large enough to cover a considerable part of the cutting line. By the use of the conical roller, the cutting line is left uncovered directly to the cutting point. This permits seeing the cutting line at the cutting point and cutting accurately to the line. This feature is especially important where the cutting line has short curves.

I claim as my invention:—

1. In a machine of the nature described, the combination of cutting means, a bearing which is on an axis which is oblique to and cuts the sheet plane near the sheet cutting point, an upper rotary feed member extending rotatably through said bearing and to the sheet plane, said bearing being yielding to allow said upper feed member to bear yieldingly upon the upper face of a sheet resting in the sheet plane, substantially as described.

2. In a machine of the nature described, the combination of cutting means, a bearing which is on an axis which is oblique to and cuts the sheet plane near the sheet cutting point, an upper rotary feed member extending rotatably through said bearing and having a conical lower end extending to the sheet plane, said bearing being yielding to allow said upper feed member to bear yieldingly upon the upper face of a sheet resting in the sheet plane, substantially as described.

3. In a machine of the nature described, the combination of cutting means, an upper feed member, and means comprising an upright, reciprocable shaft for supporting said member rotatably on an axis which is oblique to the sheet plane, said shaft being yielding endwise to allow said upper feed member to bear yieldingly upon the upper face of a sheet resting in the sheet plane, substantially as described.

4. In a machine of the nature described, the combination of cutting means, an upper feed member, and a support reciprocable on an upright path and adapted to partially rotate on an upright axis, said support supporting said upper feed member rotatably on an axis which is oblique to the sheet plane, means for yieldingly pressing said support downward, and adjusting means for partially turning said support for moving said feed member horizontally, substantially as described.

5. In a machine of the nature described, the combination of cutting means, a bearing which is on an axis which is oblique to and cuts the sheet plane near the sheet cutting point, an upper rotary feed member extending rotatably through said bearing and to the sheet plane, said bearing being yielding to allow said upper feed member to bear yieldingly upon the upper face of a sheet resting in the sheet plane, and manual means for lifting said bearing for lifting the upper feed member out of the working position, substantially as described.

6. In a machine of the nature described, the combination of cutting means, an upper feed member, means for supporting said member rotatably, a relatively weak spring tending to lift said supporting means, a stronger spring in engagement with said supporting means, and operator-controlled means adapted to force said stronger spring downward for forcing said support downward against the resistance of the weaker spring, substantially as described.

7. In a machine of the nature described, the combination of cutting means, an upper feed member, means for supporting said member rotatably on an oblique axis, a relatively weak spring tending to lift said supporting means, a stronger spring in engagement with said supporting means, and operator-controlled means adapted to force said stronger spring downward for forcing said support downward against the resistance of the weaker spring, substantially as described.

8. In a machine of the nature described, the combination of cutting means, an upper feed member, an upright shaft, means on said shaft for supporting said member rotatably on an oblique axis, a relatively weak spring surrounding and tending to lift said shaft, a stronger spring surrounding and in engagement with said shaft, and operator-controlled means adapted to force said stronger spring downward for forcing said shaft downward against the resistance of the weaker spring, substantially as described.

9. In a machine of the nature described, the combination of cutting means, an upper feed member, an upright shaft, means on said shaft for supporting said member rotatably on an oblique axis, a collar on said shaft, a relatively weak spring surrounding said shaft and bearing upward against said collar, a stronger spring surrounding said shaft and bearing downward against said spring, and operator-controlled means adapted to force said stronger spring downward for forcing said shaft downward against the resistance of the weaker spring, substantially as described.

10. In a machine of the nature described, the combination of cutting means, an upright endwise reciprocable shaft, a bearing on the lower end of said shaft on an axis which is oblique to and cuts the sheet plane near the sheet cutting point, an upper rotary feed member extending rotatably through said bearing and to the sheet plane, said shaft being yielding endwise to allow said upper feed member to bear yieldingly upon the upper face of a sheet resting in the sheet plane, substantially as described.

11. In a machine of the nature described, the combination of cutting means, an upper feed member, means comprising an upright, endwise reciprocable shaft for supporting said member rotatably on an oblique axis, said shaft being yielding to allow said upper feed member to bear yieldingly upon the upper face of a sheet resting in the sheet plane, manual means for lifting said shaft for lifting the upper feed member out of the working position, and adjusting means for partially turning said shaft to adjust said upper feed member horizontally, substantially as described.

12. In a machine of the nature described, the combination of cutting means including an upright upper reciprocatory cutter, a bearing which is on an axis which is oblique to and cuts the sheet plane near the sheet cutting point, an upper rotary feed member extending rotatably through said bearing and to the sheet plane, said bearing being yielding to allow said upper feed member to bear yieldingly upon the upper face of a sheet resting in the sheet plane, substantially as described.

13. In a machine of the nature described, the combination of cutting means including an upright reciprocatory cutter, a bearing which is on an axis which is oblique to and cuts the sheet plane near the sheet cutting point, an upper rotary feed member extending rotatably through said bearing and having a conical lower end extending to the sheet plane, said bearing being yielding to allow said upper feed member to bear yieldingly upon the upper face of a sheet resting in the sheet plane, substantially as described.

14. In a machine of the nature described, the combination of cutting means including an upright upper reciprocatory cutter, an upright reciprocable shaft, an upper feed member supported on said shaft on an axis which is oblique to the sheet plane and cuts said plane near the sheet cutting point, said shaft being yielding endwise to allow said upper feed member to bear yieldingly upon the upper face of a sheet resting in the sheet plane, substantially as described.

15. In a machine of the nature described, the combination of cutting means including an upright upper reciprocatory cutter, an upright reciprocable shaft, an upper feed member supported on said shaft on an axis which is oblique to the sheet plane and cuts said plane near the sheet cutting point, said shaft being yielding endwise to allow said upper feed member to bear yieldingly upon the upper face of a sheet resting in the sheet plane, and automatic means for rotating the upper feed member, substantially as described.

16. In a machine of the nature described, the combination of cutting means including an upright upper reciprocatory cutter, an upright reciprocable shaft, a conical upper feed member supported on said shaft on an axis which is oblique to the sheet plane and cuts said plane near the sheet cutting point, said shaft being yielding endwise to allow said upper feed member to bear yieldingly upon the upper face of a sheet resting in the sheet plane, and automatic means for rotating the upper feed member, substantially as described.

17. In a machine of the nature described, the combination of cutting means, an upright endwise reciprocable spring-controlled shaft having at its lower end a bearing transverse to the direction of the sheet feed, a feed roller resting rotatably in said bearing and reaching to the sheet plane, and driving means for rotating said feed member, substantially as described.

In testimony whereof I have signed my name, this 6th day of March, in the year one thousand nine hundred and twenty-three.

CHARLES B. GRAY.